(12) United States Patent
Brand

(10) Patent No.: US 7,133,048 B2
(45) Date of Patent: Nov. 7, 2006

(54) VARIABLE MULTILINEAR MODELS FOR FACIAL SYNTHESIS

(75) Inventor: Matthew E. Brand, Newton, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 297 days.

(21) Appl. No.: 10/881,546

(22) Filed: Jun. 30, 2004

(65) Prior Publication Data
US 2006/0001673 A1 Jan. 5, 2006

(51) Int. Cl.
*G09G 5/00* (2006.01)

(52) U.S. Cl. .................. 345/582; 345/421; 345/586; 345/646

(58) Field of Classification Search ................ 345/421, 345/473, 582, 586, 606–610, 644, 646, 647, 345/949, 955
See application file for complete search history.

(56) References Cited

OTHER PUBLICATIONS

Multilinear Analyjis of Image Ensembles:TensorFaces, M. Alex O. Vasilescu and Demetri Terzopoulos, May 2002.*
Allen, B., Curless, B., and Popovic, Z. 2003. The space of human body shapes. In *Proc. SIGGRAPH 2003*, 587-594.
Bascle, B., and Blake, A. 1998. Separability of pose and expression in facial tracking and animation. In *Proc. ICCV*, 323-328.
Birchfeld, S. 1996. Derivation of Kanade-Lucas- Tomasi tracking equation. Web-published manuscript at http://robotics.stanford.edu/birch/klt/.
Blanz, V., and Vetter, T. 1999. A morphable model for the synthesis of 3D faces. In *Proc. SIGGRAPH99*.
Blanz, V., Basso, C., Poggio, T., and Vetter, T. 2003. Reanimating faces in images and video. In *Proc. EuroGraphics 2003*.
Brand, M., and Bhotika, R. 2001. Flexible flow for 3D nonrigid tracking and shape recovery. In *Proc. CVPR 2001*.
Bregler, C., Hertzmann, A., and Biermann, H. 2000. Recovering non-rigid 3D shape from image streams. In *Proc. CVPR*.
DeCarlo, D., and Metaxas, D. 1996. The integration of optical flow and deformable models with applications to human face shape and motion estimation. In *Proceedings, CVPR96*, 231-238.
DeCarlo, D., and Metaxas, D. 2000. Optical flow constraints on deformable models with applications to face tracking. *IJCV 38*, 2, 99-127.

(Continued)

*Primary Examiner*—Matthew C. Bella
*Assistant Examiner*—G. F. Cunningham
(74) *Attorney, Agent, or Firm*—Dirk Brinkman; Andrew J. Curtin

(57) ABSTRACT

A method constructs a variable multilinear model representing a class of deformable surfaces. First, meshes of deformable surfaces are acquired. The meshes include vertices. The meshes have different identities and different expressions. The meshes can be obtained from images of human faces, where facial features, such as eyes, eyebrows, cheeks, nose, mouth and chin, form the deformable surfaces. The meshes are stored in a memory as elements of a data tensor. The data tensor is selectively flattened to matrices composed of column vectors. An imputative incremental singular value decomposition is applied to each matrix to generate a set of orthogonal bases. Then, the orthogonal bases are applied to the data tensor, via tensor multiplication, to construct a core tensor, which is the variable multilinear model representing the class of surfaces.

18 Claims, 6 Drawing Sheets

OTHER PUBLICATIONS

Georghiades, A., Belhumeur, P., and Kriegman, D. 2001. From few to many: Illumination cone models for face recognition under variable lighting and pose. *IEEE Trans. PAMI*, 643-660.

Jones, T. R., Durand, F., and Desbrun, M. 2003. Noniterative, feature-preserving mesh smoothing. In *Proc. SIGGRAPH*, 943-949.

Penev, P., and Sirovich, L. 2000. The global dimensionality of face space. In *Proc. 4th Int'l Conf. Automatic Face and Gesture Recognition*, IEEE CS, 264-270.

Perez, P., Gangnet, M., and Blake., A. 2003. Poisson image editing. In *Proc. SIGGRAPH*, 313-318.

Pighin, F., Hecker, J., Lischinski, D., Szeliski, R., and Salesin, D. H. 1998. Synthesizing realistic facial expressions from photographs. In *Proceedings of the 25th annual conference on Computer graphics and interactive techniques*, ACM Press, 75-84.

Sirovich, L., and Kirby, M. 1987. Low dimensional procedure for the characterization of human faces. *Journal of the Optical Society of America A 4*, 519-524.

Tenenbaum, J. B., and Freeman, W. T. 2000. Separating style and content with bilinear models. *Neural Computation 12*, 1247-1283.

Tipping, M., and Bishop, C. 1999. Probabilistic principal component analysis. *Journal of the Royal Statistical Society, Series B 21*, 3, 611-622.

Vasilescu, M. A. O., and Terzopoulos, D. 2002. Multilinear analysis of image ensembles: Tensorfaces. In *7th European Conference on Computer Vision (ECCV 2002) (Part I)*, 447-460.

Vasilescu, M. A. O. 2002. Human motion signatures: Analysis, synthesis, recognition. In *Proc. ICPR*.

\* cited by examiner

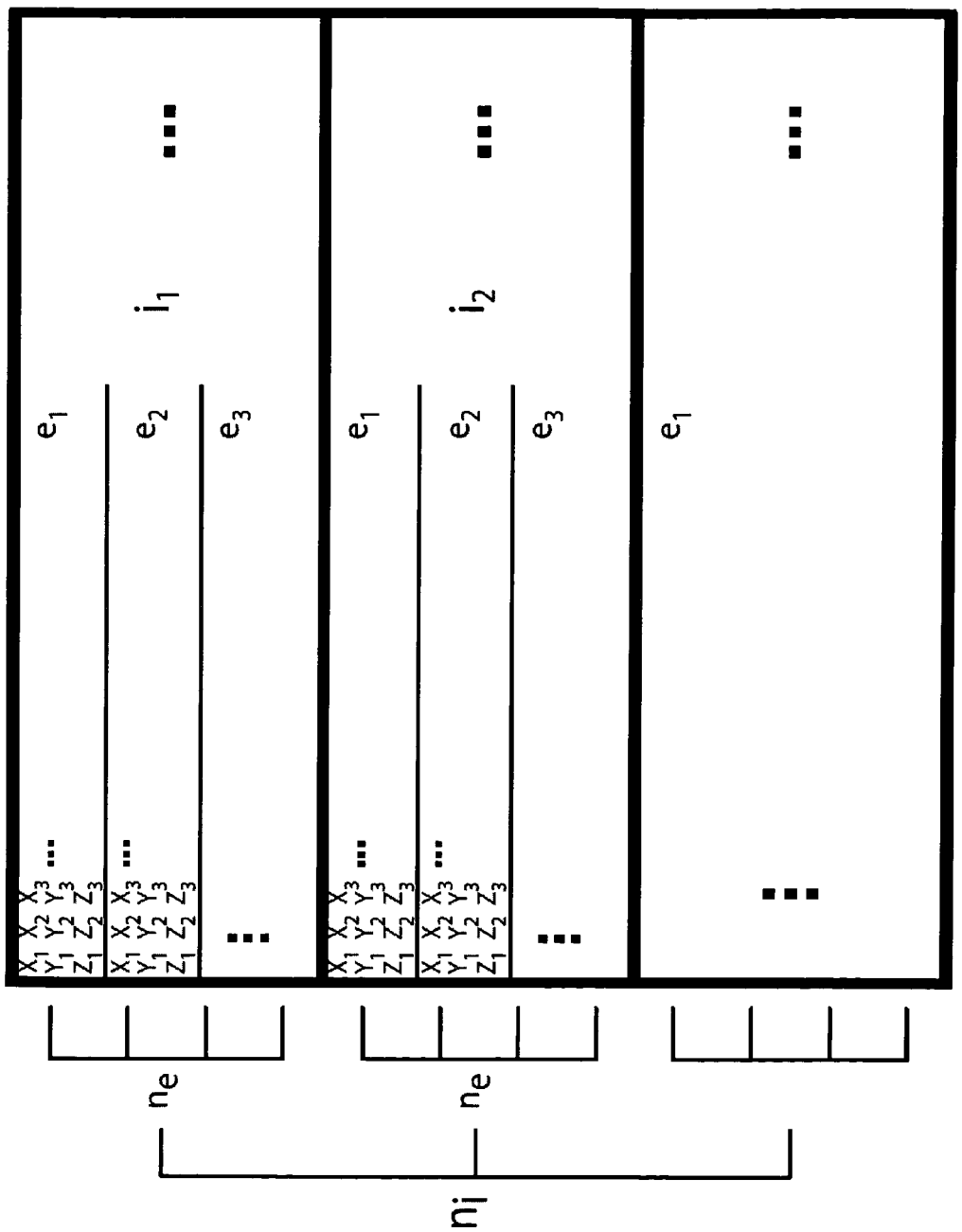

VARIABLE MULTILINEAR MODELS FOR FACIAL SYNTHESIS

FIELD OF THE INVENTION

This invention relates generally to computer generated animation, and more particularly to animating facial identities and expressions according to a multilinear model.

BACKGROUND OF THE INVENTION

If there is one thing that instantly characterizes humans, it is their faces. Hereinafter, faces of the same person are said to have identical 'identities' or 'appearances', no matter what the pose, age, or health of the face is. That is, the overall appearance of the face uniquely makes that face recognizable as being a certain person, even as the person ages over the years. Similarly, faces of different appearances, i.e., different individuals, can have the same 'expression', for example, smiling, angry, laughing, sad, tense, sneering, serious, quizzical, frowning, scowling, snarling, etc. That is, even though faces of different persons have distinctly different overall appearances, humans can easily recognize when a person is smiling or crying.

Even though, we, as humans, can readily distinguish the subtle differences between faces having different appearances and expressions, generating realistic and convincing facial animation is an extremely difficult and time intensive process, requiring highly detailed models and skillful animators.

The dominant approach is to vary a three-dimensional geometrical model with a basic set of deformations. Generating these models, adapting the models to target characters, and controlling the models are all major bottlenecks in the production process.

It is well known that variation in faces can be approximated by linear subspaces of low dimensions, whether a source of variation is an appearance (or "identity" of a person's face), a pose, an expression, or a shading pattern, Sirovich et al., "Low dimensional procedure for the characterization of human faces," *Journal of the Optical Society of America A* 4, pp. 519–524, 1987, and Penev et al., "The global dimensionality of face space," *Proc. 4th Int'l Conf. Automatic Face and Gesture Recognition*, IEEE CS, pp. 264–270, 2000.

The estimation and exploitation of these linear subspaces accounts for a large part of the prior art, notably Li et al. "3-D motion estimation in model-based facial image coding," *IEEE Trans. PAMI* 15, 6, pp. 545–555, Jun. 1993, DeCarlo et al., "The integration of optical flow and deformable models with applications to human face shape and motion estimation," *Proceedings, CVPR96*, pp. 231–238, 1996, Bascle et al., "Separability of pose and expression in facial tracking and animation," *Proc. ICCV*, p. 323–328, 1998, and Bregler et al., "Recovering non-rigid 3D shape from image streams," *Proc. CVPR*, 2000.

In computer graphics, these subspaces, known as morphable models, are a mainstay of character animation and video rewrite, Blanz et al., "A morphable model for the synthesis of 3D faces," *Proc. SIGGRAPH99*, 1999, and Pighin et al. "Synthesizing realistic facial expressions from photographs," *Proceedings of the 25th annual conference on Computer graphics and interactive techniques*, ACM Press, pp. 75–84, 1998.

Morphable appearance models are well suited for adding 3D shape and texture information to 2D images, while morphable expression models can be used for tracking and performance animation.

In consideration of the needs of animators, there have been many attempts to combine identity and expression spaces by adapting a morphable expression model to a new person.

However, such models can produce unnatural or insufficiently varied results because the models graft the expressions of the original subject, modeled as deformations of a neutral facial geometry, onto the geometry of another face.

As stated by Blanz et al. 2003, "We ignore the slight variations across individuals that depend on the size and shape of faces, characteristic patterns of muscle activation, and mechanical properties of skin and tissue."

It is well known in computer vision that variation in facial images is better modeled as being multilinear in pose and expression, identity, lighting, or any combination thereof. Put simply, whatever the function that generates face images, a multilinear model will capture more terms of its first-order Taylor approximation than a linear model, thus multilinear models can offer better approximations.

Most important for animation, multilinear models offer separability of attributes so that the models can be controlled independently. In general, separability is not compatible with statistical efficiency in linear subspace models, except in the vastly improbable case that all variations between people are orthogonal to all variations between expressions. This is not possible in a world where gravity endows older faces with a natural frown.

As with linear models, the main empirical observation is that the data approximation offered by multilinear models is quite good, in particular, the efficacy of multilinear models for recognition and synthesis of image and motion capture data, Vasilescu et al., "Multilinear analysis of image ensembles: Tensorfaces," *7th European Conference on Computer Vision(ECCV2002)(Part I)*, pp. 447–460, 2002, and Vasilescu, "Human motion signatures: Analysis, synthesis, recognition," *Proc. ICPR*, 2002.

Another appeal of those methods is their simplicity of use. A linear morphable model is easily estimated from a matrix of example faces via a singular value decomposition (SVD), and connected to vision or rendering through simple linear algebra.

Similarly, a multilinear model can be estimated from a tensor of example images via higher-order singular value decomposition (HOSVD), a generalization of SVD, Tucker, "The extension to factor analysis to three-dimensional matrices," *Contributions to mathematical psychology*, Gulliksen et al., Eds, Holt, Rinehard & Winston, N.Y., pp. 109–127, 1964, Lathauwer et al., "A multilinear singular value decomposition," *SIAM J. Matrix Analysis and Applications* 21, 4, pp. 1253–1278, 1994, and Lathauwer, "*Signal Processing based on Multilinear Algebra*," Ph.D. Thesis, Katholieke Universiteit Leuven, Belgium, 2000.

SUMMARY OF THE INVENTION

Good control over identity and expression is a recurring problem in facial animation. Multilinear analysis offers a natural way to model heterogeneous sources of variation. However a number of problems stand in the way of constructing and deploying such models.

The invention provides a variable multilinear model for facial animation that includes two or more sets of control parameters to vary the model. In a preferred embodiment, one set of parameters controls identity, and another set controls expression. If there are only two sets, the model is bilinear.

The parameters can be set manually or controlled via a video. Unlike linear models, the identity can be adjusted while the expression is preserved, and vice versa. This greatly simplifies animation tasks such as porting performances from one character to another, and post-production tasks such as changing the identity or appearance of a character.

The invention addresses two problems associated with using multilinear models: building a compelling model without a complete Cartesian product of all attributes, e.g., identities in all expressions; and controlling the model without motion capture or manual key-framing.

The invention enables one to estimate a detailed model from incomplete data. In addition, identity and expression parameters can be extracted from a video and used in performance animation, video rewrite, actor replacement, and related forms of video modification. The source and target actors need not be in the estimation data or available for detailed measurement.

BRIEF DESCRIPTION OF THE DRAWINGS

FIGS. 5 and 6 are block diagrams of tensor flattenings according to the invention.

DETAILED DESCRIPTION OF THE PREFERRED EMBODIMENT

System and Method Overview

Constructing a Multilinear Model for Faces

Figure 1:
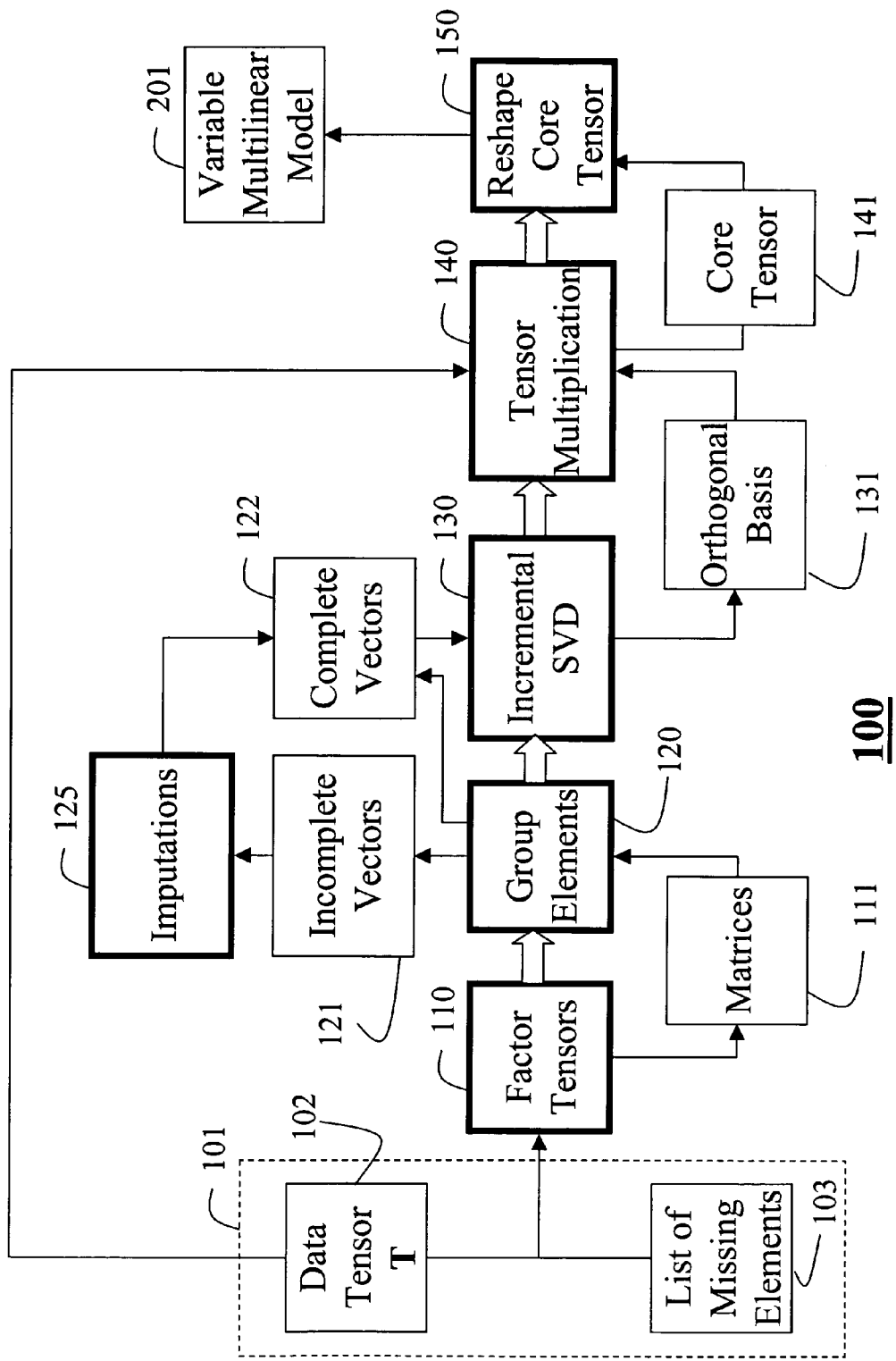
FIG. 1 is a flow diagram of a method for constructing a multilinear model according to the invention.

FIG. 1 shows a higher-order SVD (HOSVD) 100 that is applied to data 101 stored in a memory to generate a variable multilinear model 201 according to the invention. The input data includes a data tensor 102 and, optionally, a list of missing elements 103.

Figure 2:
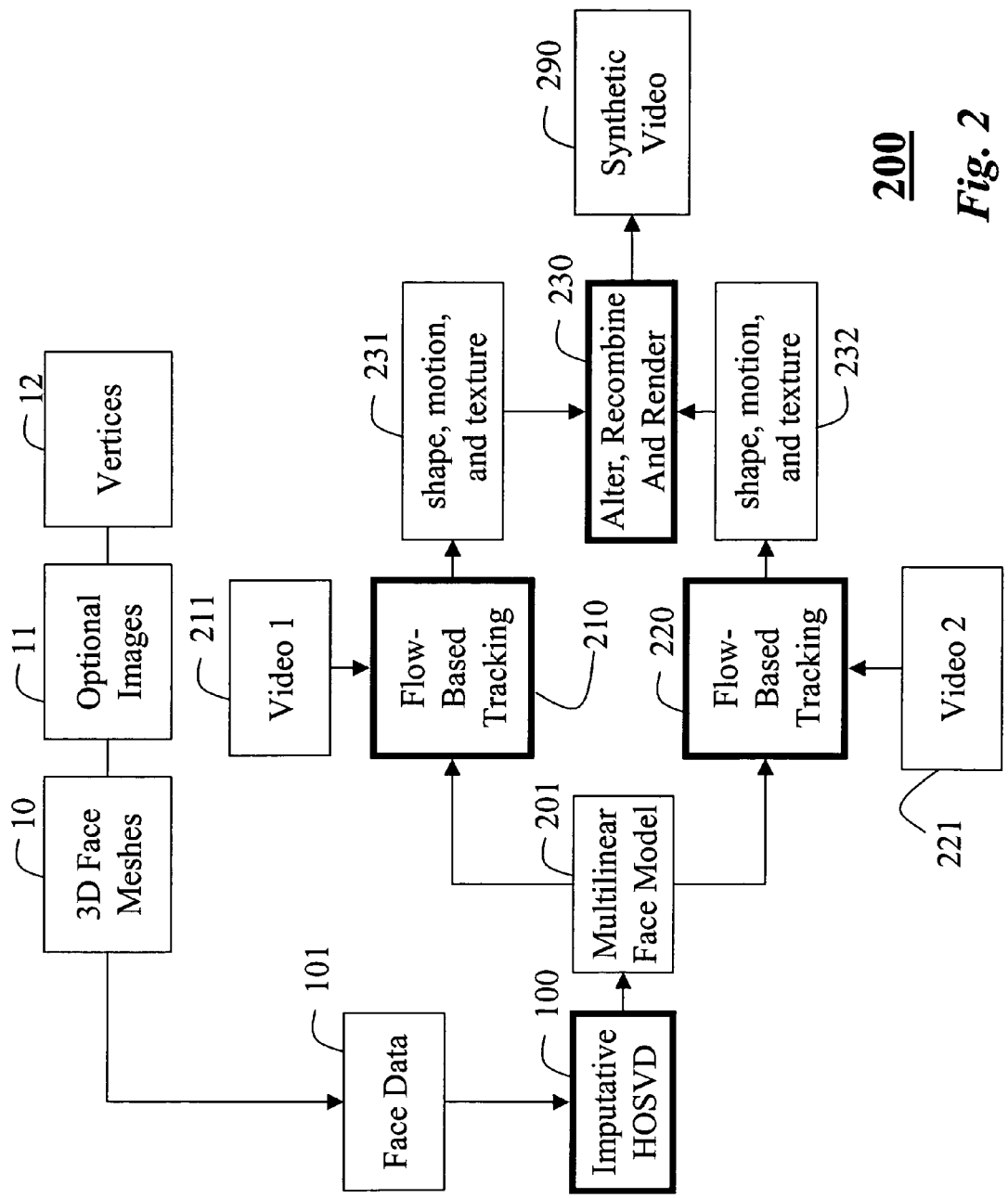
FIG. 2 is a flow diagram of a method for applying the multilinear model of FIG. 1 to face data and videos to generate a synthetic video according to the invention.

FIG. 2 shows the method 200 for applying the multilinear model 201 to videos 211 and 221 to synthesize a new video 290. The model 201 is constructed from a set of facial geometry meshes 10, optional images 11 and vertices 12.

Figure 4:
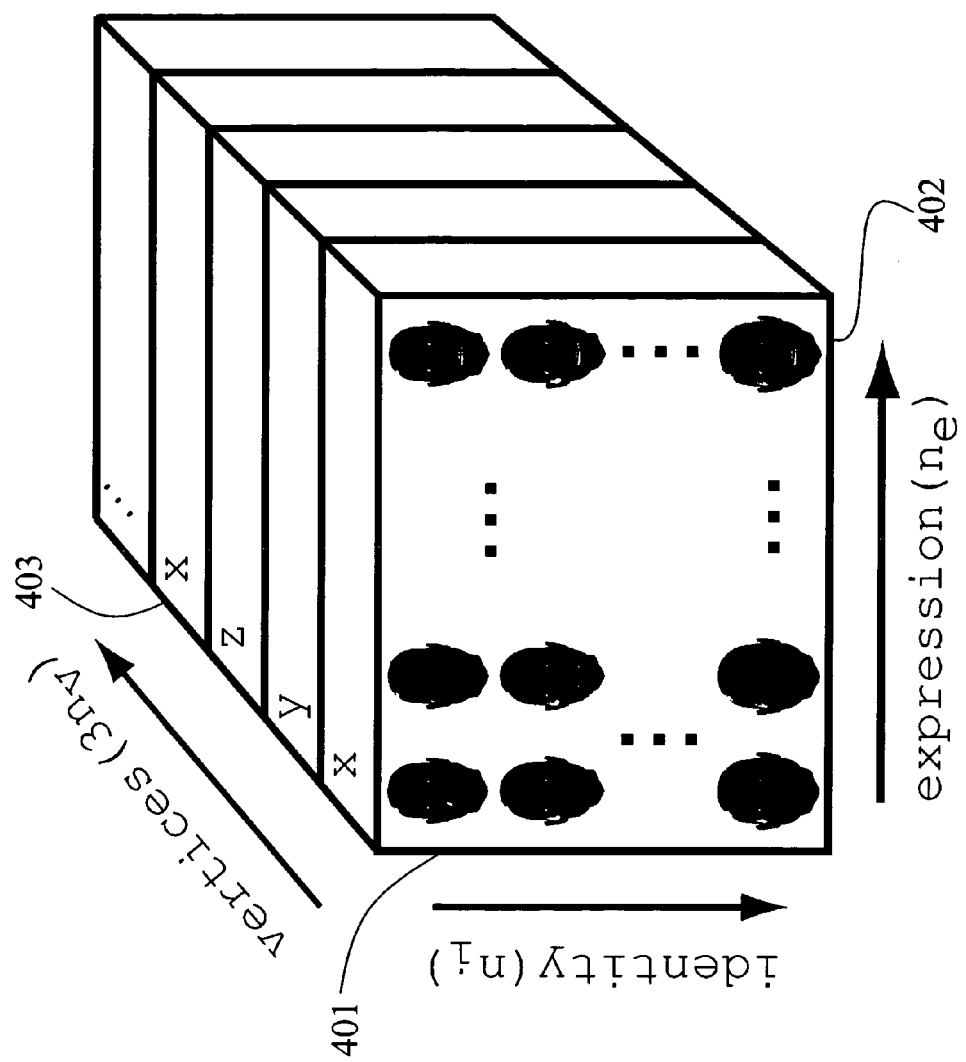
FIG. 4 is a block diagram of an identity and expression tensor data structure according to the invention.
Figure 5:
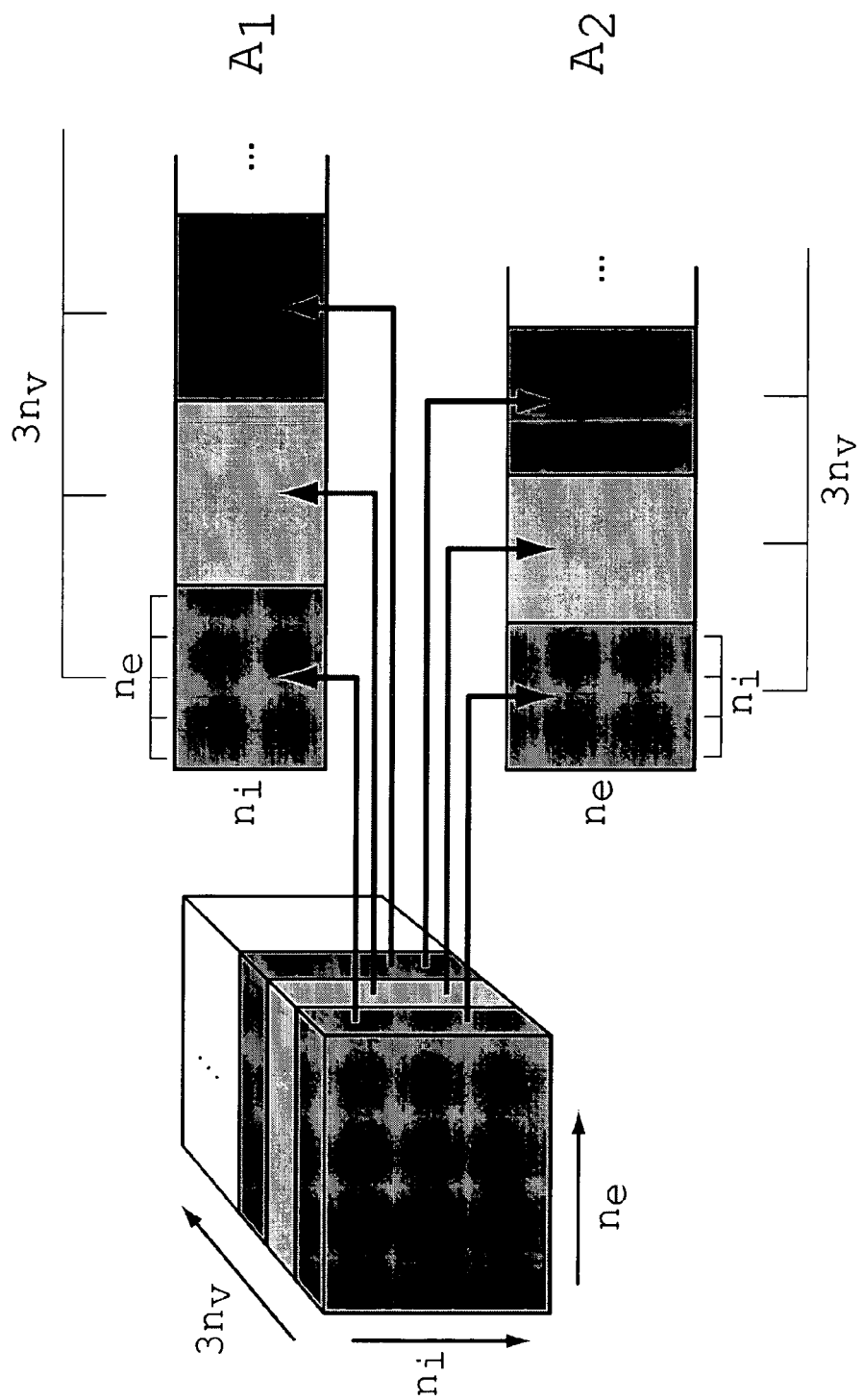

The data tensor 102 is flattened 110 to construct matrices 111, see also FIGS. 4–6. The columns of the matrices are vectors. As shown in FIG. 4, for a bilinear face model, the vertices 12 are organized in the tensor 102 by the appearance of individuals with different identities ($n_i$) along the vertical-axis 401, expressions ($n_e$) along the horizontal axis 402, and three dimensional mesh vertices ($3n_v$) along the depth axis 403. Mesh vertices are described below.

If necessary, elements of the matrices 111 are grouped 120 into incomplete vectors 121 and complete vectors 122. If there are incomplete vectors, these can be imputed 125 to generate complete vectors from the missing elements, according to the list 103.

An incremental SVD is applied 130 to the complete vectors to generate an orthogonal basis 131 for each flattening. The basis is used to impute 125 the missing parts of incomplete vectors, which are then used to update the basis through the incremental SVD 130. When all vectors have been processed, a tensor multiplication is applied 140 to all orthogonal bases and the data tensor 102 to construct a core tensor 141. The core tensor can be reshaped 150 to form the multilinear model 201.

Tracking Faces in Videos

Figure 3:
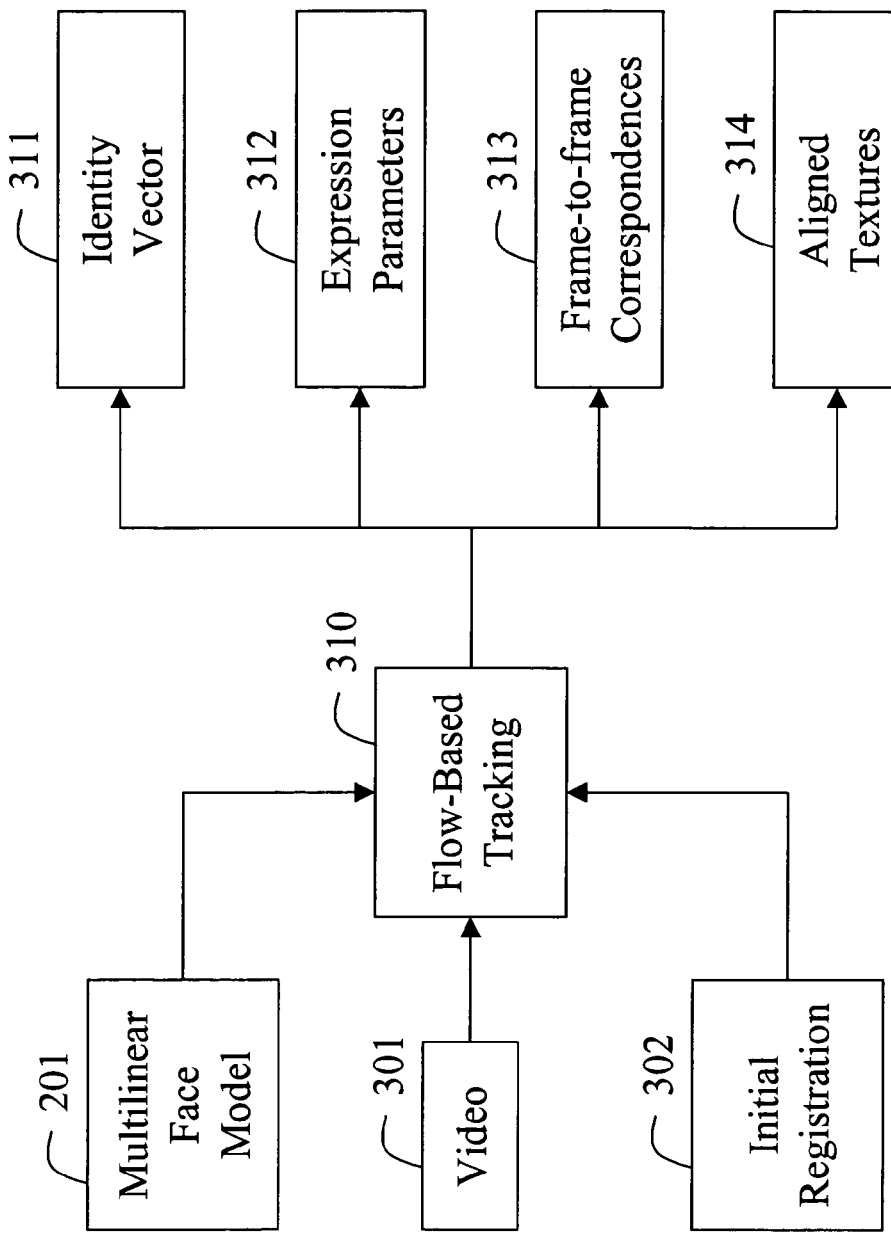
FIG. 3 is a flow diagram of a flow-based tracking method according to the invention.

As shown in FIGS. 5 and 6, using labeling consistent with FIG. 4, the multilinear face model 201 is flattened so that each column vector contains a basis for one mesh vertex. As shown in FIG. 2, this flattening is provided to flow-based tracking modules 210 and 220. Each tracking module processes corresponding videos 211 and 221. FIG. 3 shows further details of the tracking modules. Each tracking module generates shape, motion, and texture data 231 and 232, respectively for each video. The data can then be edited, combined, and rendered 230 to generate the new synthetic video 290, where faces assume new expressions or new identities, or both.

In the flow-based tracking method according to the invention 300, as shown in FIG. 3, flow-based tracking 310 is applied to a video 301, using the model 201, after initial registration 302. The tracking generates an identity vector 311, expression parameters 312, from-to-frame correspondences 313, and alignment textures 314, which constitute the shape, motion, and texture data 231–232 of FIG. 2.

These steps are now described in greater detail.

Higher-Order SVD

The higher-order SVD (HOSVD) 100 is a multilinear generalization of singular value decomposition to n-tensors, i.e., multi-dimensional matrices 111 with n subscripts.

In essence, one determines, via a conventional SVD, an orthogonal basis $U_k$ 131 for each of n different "matrix flattenings" of the tensor 102 $T \in \Re^{d_1 \times d_2 \times \cdots \times d_k \times \cdots \times d_n}$. A flattening re-arranges the tensor into matrices 111 whose columns preserve element order along a particular axis of the tensor T 102, see FIGS. 5–6.

Matrix-Tensor Operators

Tensor operations can be reduced to matrix operations through three operators. A Kronecker product $A \otimes B$ replaces each scalar element $A_{ij}$ with a scalar-matrix product $A_{ij}B$. A vector-transpose $M^{(d)}$ transposes a matrix M by moving vertical groups of d elements together. A vector-reshape $\text{vec}_d M$ reshapes the matrix M to have d rows, where vecM constructs a vector, Magnus et al., "*Matrix differential calculus with applications in statistics and econometrics*," Wiley, 1999, Brand and Bothika, "Flexible flow for 3D nonrigid tracking and shape recovery," *Proc. CVPR* 2001, and U.S. patent application Ser. No. 02003820.4, "Modeling Shapes, Motions, Flexions and Textures of Non-Rigid 3D Objects Directly from Video," filed by Brand on Feb. 22, 2001, incorporated herein by reference.

HOSVD of a Tensor

A flattening $T_{(k)}$ that preserves the $k^{th}$ axis is expressed with the matrix-tensor operators as $$T_{(k)} = \text{vec}_{d_k}(((\text{vec}T)^{d_1 d_2 \cdots d_{k-1}})^T).$$

The orthogonal basis $U_k$ of the $k^{th}$ flattening 110 is the left singular vectors of $T_{(k)}$. The HOSVD generalization of the singular value matrix is a core tensor S, determined as $$S = T \times_1 U^T_1 \times_2 U^T_2 \cdots \times_n U^T_n,$$

where the $k^{th}$-mode multiplication $\times_k$ satisfies $$(T \times_k U_k)_{(k)} = U_k T_k.$$

The tensor T 102 can then be reconstructed by a tensor multiplication $$T = S \times_1 U_1 \times_2 U_2 \ldots \times_n U_n.$$

Reshaping ensures that the reconstructed tensor is in correct form.

A conventional matrix SVD $USV^T = M \in \Re^{d_1 \times d_2}$ is written as $M = S \times_1 U \times_2 V$. This can also be written element-wise as $$T_{ijk\ldots} = \sum_{ijk\ldots} S_{abc\ldots} \cdot (U_1)_{ia} \cdot (U_2)_{jb} \cdot (U_3)_{kc} \ldots,$$

a sum of $n^{th}$ degree monomials. If the orthogonal basis $U_k$ is truncated to the principal singular vectors of the flattening $T_{(k)}$, then the core tensor S 141 is smaller than the data tensor T 102, and $\{S, U_1, \ldots, U_n\}$ is a truncated, low-rank multilinear approximation of the data tensor T 102. This is analogous to a thin SVD.

As with the SVD, an accurate low-rank approximation implies redundancy in the data and good prospects for generalization. Unlike the SVD, Lathauwer showed that simply truncating an HOSVD does not necessarily yield an optimal low-rank multilinear model, though the model is usually near-optimal, and the bases $U_k$ are easily refined to improve the approximation via alternating least-squares. The HOSVD also differs from the conventional SVD in that the tensor need not be flattened 110 along all axes. That is, only a subset of axes can be flattened to yield a partial HOSVD.

Bilinear Face Model

The model 201 of a face is estimated from a set of detailed 3D face meshes. Each mesh has about N=30,000 vertices obtained by a structured light scanner. Faces of a number of individuals, e.g., fifteen, are scanned with a number of expressions each, e.g., ten, to span a wide space of expressions. Obviously, better results are obtained for a larger number of different faces, different appearances or identities, and different expressions. The scans are smoothed to eliminate noise using a bilateral filter, Jones et al., "Noniterative, feature-preserving mesh smoothing," *Proc. SIGGRAPH*, pp. 943–949, 2003.

The meshes of vertices are Procrustes aligned in three-dimensions, and put into dense correspondence as follows. An average high-resolution face obtained by averaging a separate large database of laser-scans is deformed to fit each scanned face in a variation on a correspondence algorithm, Allen et al., "The space of human body shapes," *Proc. SIGGRAPH* 2003, pp. 587–594, 2003. A deformation is initialized with manually picked vertex correspondences, e.g., about fifty.

The vertex locations are arranged in the three-dimensional data tensor 102 of dimension 3N×15×10, see FIGS. 4–6. Here, there are fifteen different identities, and ten different expressions. A partial HOSVD of the tensor 102 is determined by factoring (flattening) along identity and expression axes 401 and 402 to obtain a rank-reduced multilinear model with expression basis $C \in \Re^{15 \times E}$, E=11, identity basis $D \in \Re^{10 \times I}$, I=8, and the core tensor $S \in \Re^{3N \times E \times I}$, so that $T = S \times_2 C \times_3 D$. Unusable and omitted scans can lead to missing data in the data tensor 102. That problem is solved below.

After flattening (factoring) and re-arranging, see FIGS. 5–6, the core tensor 141 is $$S \leftarrow (vec_{3N} S_{(1)})^{(3)} \in \Re^{3EI \times N}.$$

The N vertex locations of the face mesh of the $i^{th}$ person (identity) in the $j^{th}$ expression are bilinearly reconstructed as $$F_{ij} = (d_i \otimes C_j \otimes I_3) S \in \Re^{3 \times N},$$

with $d_i \in \Re^I$, being the $i^{th}$ row of D, $c_j \in \Re^E$ the $j^{th}$ row of C, and $I_3$ the 3×3 identity matrix. The parameter vectors c and d can be varied smoothly to morph between expressions and identity, respectively.

With the invention, it is possible to synthesize a new face by varying the identity or appearance according to control parameters, and keeping the expression constant, or vice versa.

Model Estimation from Incomplete Data

In practice, the full Cartesian product of variations may not be available for estimating an HOSVD. For example, some input data may be corrupt or missing, or when developing a large database, some actors may not be available for scanning all expressions images for all identity images. This presents an incomplete data problem, which is addressed below.

The HOSVD is under-determined when the data are incomplete. That is, there is a manifold of equally valid but varied solutions. Nevertheless, it is believed that the equivalent truncated HOSVD problem can be well-determined in some settings.

This problem has been addressed in a bilinear context or ordinary SVD, Tenenbaum et al., "Separating style and content with bilinear models," *Neural Computation* 12, pp. 1247–1283, 2000. They describe an iterative conjugate gradient search in model space, but found little advantage over a direct SVD of data with missing elements filled with row- and column-averages, at expense of an order of magnitude more computation. However, it is known that even when the data truly is low-rank, filling with averages can recover an inefficient high-rank model, Brand, "Fast online SVD revisions for data mining and recommending," *Proceedings, SIAM International Conference on Data Mining*, 2003, incorporated herein by reference.

A principle for filling missing elements using statistics gathered from known elements is called an imputation 125. The invention provides an imputation rule that is appropriate for the HOSVD, and a fast process for determining an HOSVD of incomplete data. The key observation is that if the data truly has low-rank tensor structure, then the subspaces occupied by known elements constrain the possible values of missing elements. Because tensors have multiple subspaces, one associated with each flattening, the missing elements are richly constrained. Each flattening of the tensor has a maximum variance-preserving of a subspace, which is estimated provisionally from known elements via SVD. Then, one can 'sweep' through the incomplete columns of each flattening, alternating between estimating the missing values from the subspace constraints, and updating the subspaces from the completed column vectors.

Imputative HOSVD

For imputation in an ordinary matrix SVD, the data are viewed as samples from a Gaussian distribution that lies in, or nearly in a subspace. If the data are centered by removing row means, then column-space singular vectors U and singular values S factor a covariance of the empirical Gaussian density $$N(\mu = 0; \Sigma = US^2 U^T).$$

Imputation is a matter of completing vectors to have maximal probability vis-a-vis this density. If vector x is a column having missing elements, then the most probable imputation minimizes the Mahalanobis distance $$(x-\mu)^T(\Sigma+\epsilon I)^{-1}(x-\mu),$$

where $\epsilon$ is the variance of a prior probability on vectors that encodes our prior belief that imputed values are not arbitrarily large.

The solution is a setting of the missing elements that solves the linear equation $$(S+\epsilon I)^{-1}U^T x=(S+\epsilon I)^{-1}U^T\mu,$$

in the least-squares sense. This recovers the hard subspace imputation rule of Brand, "Fast online SVD revisions for data mining and recommending," *Proceedings, SIAM International Conference on Data Mining*, 2003 as $\epsilon$ approaches zero.

In "hard" SVD-based imputation, one forces the imputed vector to lie in the subspace by setting $x_\circ \leftarrow U_\circ U^+ X_\bullet$, where the empty and full circles indicate that we have selected rows corresponding to missing and known elements, respectively, and U is thin.

In imputative SVD, one determines a provisional SVD USV$^T$ of all complete columns, then alternates between using the provisional density to complete an incomplete column vector x, and using the completion to update U, S, V and the density via rank-1 update rules. This is a causal process with the result determined by the ordering of imputations. Therefore, it is advantageous to do the best-constrained imputations first, by sweeping through incomplete columns most-complete first. The approximation error can be bounded in probability via large deviation theory, and this method leads to excellent prediction rates in data-mining imputation.

The generalization to HOSVD revolves around the singular vectors $U_k$ and values $S_k$ of each flattening $T_{(k)}$. The flattening $T_{(k)}$ is almost certainly not centered, so the data are viewed as normally distributed in an affine subspace. Thus, the desired orthogonal basis $U_k$ is not a factor of the column-space covariance. However, it is related through a transform.

First, estimate and remove the row-means to center $T_{(k)}$. Then, determine its left singular vectors and values via imputative SVD, as described above. The final estimate of the orthogonal basis $U_k$ is obtained through a rank-1 update of the SVD. Such an update is described in Brand, "Fast online SVD revisions for data mining and recommending," *Proceedings, SIAM International Conference on Data Mining*, 2003. This update effectively restores the mean that was removed from the flattening.

Imputative HOSVD presents a further complication that a missing element appears in one column of each flattening $T_{(i)}, T_{(j)}, T_{(k)}$, etc. Therefore, the missing element is jointly constrained by $U_i, U_j, U_k$, etc. Because the tensor is a multilinear model, the missing element is subject to a product-of-Gaussians density. To impute, one must minimize a sum of Mahalanobis forms simultaneously by combining the corresponding linear equations. For example, if the data tensor has a single missing value that occurs in columns $\{X_1 \epsilon T_{(1)}, X_2 \epsilon T_{(2)}, \ldots\}$, then its imputation is $$\begin{bmatrix} ((S_1+\epsilon I)^{-1}U_1^T)\circ \\ ((S_2+\epsilon I)^{-1}U_2^T)\circ \\ \vdots \end{bmatrix}^+ \begin{bmatrix} ((S_1+\epsilon I)^{-1}U_1^T)\bullet(\mu_1-x_1)\bullet \\ ((S_2+\epsilon I)^{-1}U_2^T)\bullet(\mu_2-x_2)\bullet \\ \vdots \end{bmatrix},$$

where $M_\circ$(resp. $M_\bullet$) selects the column(s) of M and rows of x corresponding to the missing (resp. known) value(s) of $\{x_1, x_2, \ldots\}$. The above formula can determine multiple missing values if they co-occur in a column of a flattening. To determine how such imputations are grouped, one constructs a graph whose vertices represent the missing elements. Two vertices are connected if the missing elements share an index in the tensor, e.g., $T_{abc}$ and $T_{def}$ are connected if, and only if a=d or b=e or c=f. The imputation groups are the connected components of this graph.

In principle, an HOSVD can be imputed for any sparsely populated n-tensor, as long as at least one exemplar is present in all variations. However, it is not known formally how the quality of the model depends on the tensor dimension n or the level of sparsity. It is known that in some cases highly predictive imputations can be obtained from matrices that are 95% empty.

On average, the root-mean-squared error of the imputation is roughly ½ that of the best possible weighted combination of faces having the same identity or expression. This is evidence that everybody's smile is idiosyncratic, and that departures from the mean smile are not "slight" as described Blanz et al. The fact such good imputations are obtained from a very small dataset augurs well for larger HOSVDs estimated from sparse data, and is consistent with the fact that HOSVD imputation is better constrained than SVD imputation.

Connecting the Model to a Video

In order to leverage an HOSVD of detailed 3D face mesh into a tool for facial animation and video/film post-processing, it must be usable in settings where 3D measurements or the actor of interest are unavailable. Clearly the HOSVD model becomes broadly useful if the model can be connected directly to image sequences, as shown in FIG. 2. Motion of facial features in an image sequence is trilinear in pose, identity, and expression. The features of a face, which can form the deformable surface include eyes, eye lids, eye brows, front head, cheeks, nose, mouth, lips and chin, for example.

FIG. 2 diagrams how these parameters are extracted from image sequences. This provides all the information needed to drive animation of another character or supporting rewrite of the original video. The key relation is the projection of face mesh vertices onto the image plane.

Given an identity or appearance vector $d\in\Re^I$, expression vector $c\in\Re^E$, flattened HOSVD core tensor $S\in\Re^{3EI\times N}$, and the first two rows $R\in\Re^{2\times 3}$ of a 3D rotation matrix, a weak perspective camera views the vertices at N image locations as $$P=(d\otimes c\otimes R)S\in\Re^{2\times N} \quad (1)$$

plus an image-space translation. Weak perspective gives the scaling but not distorting effects of full perspective. There is a more complicated full-perspective formulation. But when the camera is two or more meters from the face, as is a convention in film production, weak perspective trackers are numerically competitive with full perspective trackers.

To lift pose, identity (appearance), and expression parameters from image sequences, see FIG. 3, motions of the projected vertices are related, written as $F=P_{frame1}-P_{frame0}$, to changes in the pixel brightness values via optical flow. In essence, one solves for a combination of rigid motion and model-sanctioned deformation that brings many small texture patches observed in two images into optimal correspondence. This directly extends the method of Brand and Bhotika to multilinear models.

Estimating Pose and Expressions

Most modern optical flow frameworks reduce to an equation of the form Af=b, where A is a matrix derived from spatial image gradients, b is a vector derived from temporal image gradients, and f is the displacement or flow. In the preferred implementation, a symmetric Lucas-Kanade formulation of optical flow is used to determined A and b at many image sites. The results are combined in a large matrix equation $$XvecF = y, \quad (2)$$

with X containing diagonally stacked A's and y containing vertically stacked b's.

One can substitute the projection of equation (1) into the flow equation (2) and isolate any parameter vector of interest as a function of the rest.

Tracking a subject in video is then a matter of sampling gradients from the images, and solving for the desired parameters via alternating least-squares. This is a quickly converging Newton's method that optimizes all pose, identity, and expression parameters relative to the video. Fast convergence assumes that motions are small relative to spatial and temporal sampling windows, which are ensured by using a multi-resolution approach. This method essentially uses each video frame as a reference texture for the next, but can just as easily exploit a known texture map or texture function, if available.

Tracking is initialized 302 by manually superimposing the model on the first frame, though one can possibly use other methods, such as the method described by Blanz et al., see above.

Estimating Identity

Under ideal circumstances, the estimated identity vector converges rapidly and remains stable through an entire image sequence. Unfortunately, individuals may exhibit shape variations not spanned by the original data tensor, and the tracker is free to accommodate these variations by continually adjusting the identity vector, if necessary. Thus, a constraint that identity remains constant over the whole sequence is formulated.

The sequence is tracked to obtain pose and expression parameters, then one solves, in a least-squared-error sense, for a single identity vector d that optimizes the fit of the HOSVD model to the entire image sequence relative to performance parameters. This is essentially a concatenation of all identity equations from all frames, derived from equation (1) to yield the system $$\begin{bmatrix} (S_1^T \otimes I_2)(I_E \otimes vecR_1) \\ (S_2^T \otimes I_2)(I_E \otimes vecR_2) \\ \vdots \end{bmatrix} vecd = \begin{bmatrix} vecP_1 \\ vecP_2 \\ \vdots \end{bmatrix},$$

where $c_i$, $R_i$, $P_i$ are the expression vector, projective rotation, and object-centered tracked point locations in frame i, respectively, and $S_i = (I_f \otimes c_i \otimes I_3)S$ is an expression-specific morphable identity basis. After the new identity is found, take a small step toward it, re-track the sequence with the new identity, and repeat to convergence.

Estimating a Texture Basis

Tracking gives identity, pose, and expression parameters for every frame, as well as semi-dense frame-to-frame correspondences. These correspondences are used to warp facial texture in each frame to a canonical texture layout. Then, linear regression is used to map the texture onto the expression parameters. This gives an actor-specific texture function that modifies texture as a function of expression. For example, it shades forehead wrinkles when the eyebrows rise and changes the color of the lips when they are stretched.

Texture can also be modeled as a bilinear function of identity and expression. Texture data can either be incorporated into the shape HOSVD or assembled into a separate texture tensor $T_{texture}$ and regressed bilinearly onto the shape parameters using the formula $S_{texture} = T_{texture} \times_1 C^T \times_2 D^T$. The latter scheme corresponds to the intuition that changes in skin color are mainly a function of changes in shape, e.g., stretching and wrinkling.

Other Applications

Although the invention has been described with respect to animating human faces, it should be understood that the invention can also be applied to non-human faces or any other kind of flexible, deformable surfaces or manifolds having different shapes and appearances (texture). Furthermore, the imputative HOSVD can be applied to any kind of vector data sampled from a process that varies along more than one attribute.

EFFECT OF THE INVENTION

The invention enables one to estimate a highly detailed face model from an incomplete sample of face scans. This model is a bilinear or multilinear HOSVD and thus has the key property of separability. Identity and expression can be manipulated independently. Thus, a smile is always a smile, though smiled in a style idiosyncratic to each identity. The invention provides a practical tool for animation by connecting the model to a video, showing how to recover the identity, expressions, and poses of an actor, as well as an expression-driven texture function for his or her face.

The method according to the invention greatly simplifies the editing of identity, performance, and facial texture in video, enabling video rewrite applications such as performance animation (puppetry) and actor replacement. In addition the model offers a rich source of synthetic actors that can be controlled via video.

In the preferred embodiment, a 3-tensor dataset, i.e., vertex×identity×expression, is used, but the method can be generalized to n-tensors. For example, it is possible to determine the HOSVD of a very incomplete vertex×identity×expression×age 4-tensor, producing a model that gives us control over an actor's apparent age.

With imputation, only a small subset of the subject actors need to be scanned at more than one age—the rest can be aged, or restored to youth, at the discretion of a director.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for constructing a variable multilinear model representing a class of deformable surfaces, comprising:

acquiring a plurality of meshes of a plurality of deformable surfaces, the plurality of meshes having different identities and different expressions;

storing the plurality of meshes as elements of a data tensor in a memory;

selectively flattening the data tensor to a plurality of matrices;

applying an incremental singular value decomposition to each matrix to generate a set of orthogonal bases; and applying the bases to the data tensor, via tensor multiplication, to construct a core tensor, the core tensor being the variable multilinear model representing the class of deformable surfaces.

2. The method of claim 1, further comprising:
combining selected elements of the data tensor according to the variable multilinear model to generate a synthetic deformable surface for rendering.

3. The method of claim 1, in which the deformable surfaces are faces.

4. The method of claim 3, further comprising:
acquiring a first video of a first face;
acquiring a second video of a second face;
applying flow-based tracking to the first video according to the variable multilinear model to extract first shape, motion, and texture data;
applying flow-based tracking to the second video according to the variable multilinear model to extract second shape data, motion data and texture data; and
combining the first and second shape data, motion data and texture data to generate a synthetic video of a synthetic face that combines features of the first face and the second face.

5. The method of claim 1, in which the data tensor has a plurality of axes, and the flattening is along a subset of the axes.

6. The method of claim 1, in which images having identical identities ($n_i$) are arranged along a first axis of the tensor, images having identical expressions ($n_e$) are arranged along a second axis of the tensor, and vertices ($3n_v$) in the image are arranged along a third axis of the tensor.

7. The method of claim 1, in which the singular value decomposition is imputative if the data tensor is incomplete.

8. The method of claim 4, further comprising:
multilinearly regressing the first and second texture data onto the motion data and the shape data to yield a texture function for the synthetic face.

9. The method of claim 4 wherein parameter settings are used to animate the synthetic face.

10. The method of claim 9 wherein first parameters related to the identity of the synthetic face are determined for the entire synthetic video, while second parameters related to expression of the synthetic face are determined for each image in the synthetic video.

11. The method of claim 3, in which the plurality of meshes are of faces having different ages to incorporated the ages into the variable multilinear model.

12. The method of claim 11, in which the variable multilinear model is used for identifying the ages of the faces.

13. The method of claim 3, in which the plurality of meshes are of faces having different health characteristics to incorporate the health characteristics into the variable multilinear model.

14. The method of claim 11, in which the variable multilinear model is used for diagnosing the health characteristics of the faces.

15. The method of claim 1, further comprising:
truncating the orthogonal bases and core tensor to compress the variable multilinear model to a low-rank approximation of the data tensor.

16. The method of claim 1, in which the column vectors of each matrix correspond to the orthogonal bases.

17. The method of claim 3, in which the features of the face form the deformable surfaces.

18. The method of claim 17, in which the features include eyes, eye lids, eye brows, front head, cheeks, nose, mouth, lips and chin.

* * * * *